(No Model.)
C. B. COLE.
UNDERGROUND CONDUIT FOR ELECTRICAL CONDUCTORS.
No. 403,825. Patented May 21 1889.
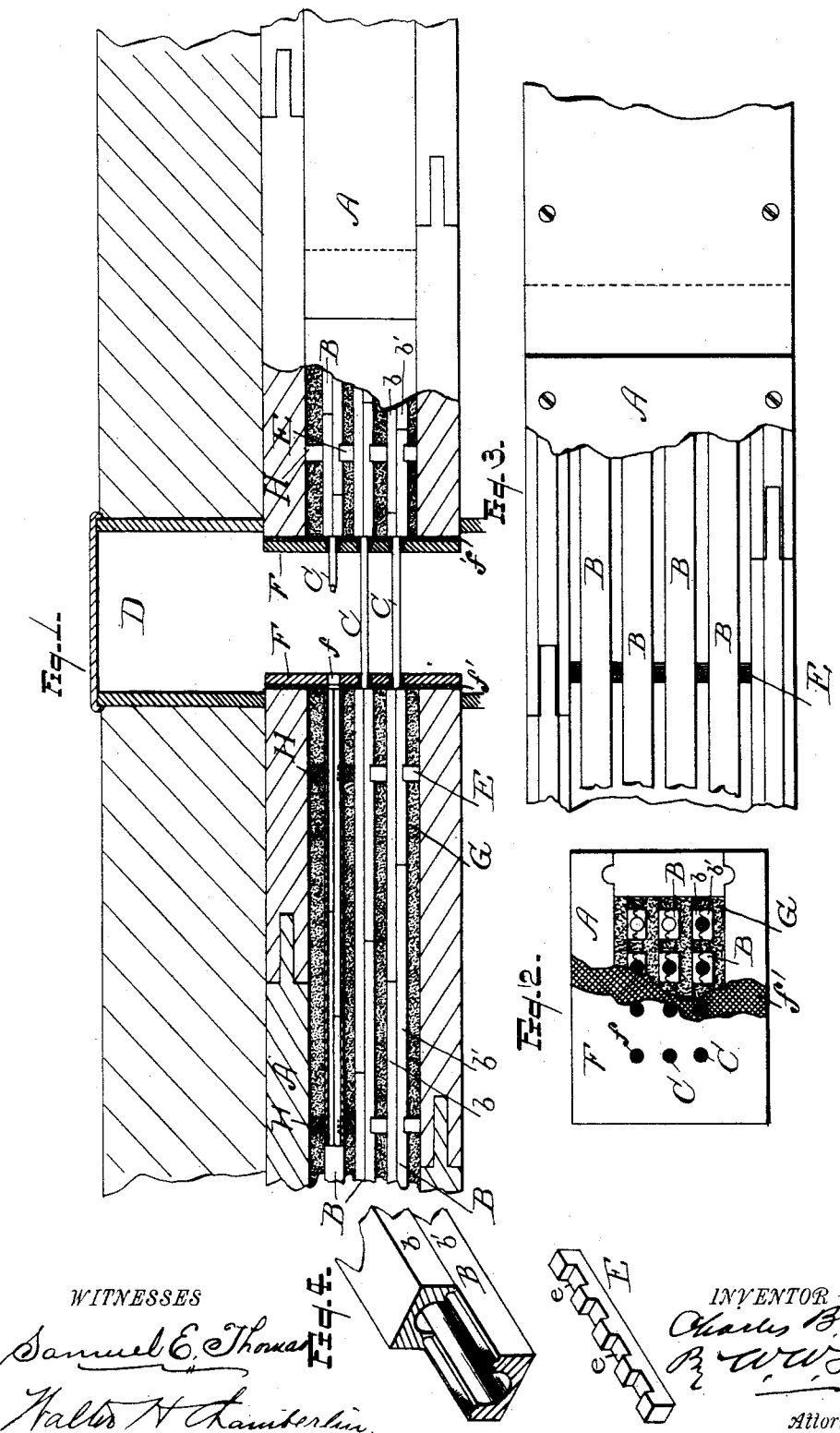
WITNESSES
Samuel E. Thomas
Walter H. Chamberlin
INVENTOR
Charles B. Cole,
By W. W. Figgis.
Attorney

UNITED STATES PATENT OFFICE.

CHARLES B. COLE, OF DETROIT, MICHIGAN, ASSIGNOR TO THE COLE CONDUIT COMPANY, OF SAME PLACE.

UNDERGROUND CONDUIT FOR ELECTRICAL CONDUCTORS.

SPECIFICATION forming part of Letters Patent No. 403,825, dated May 21, 1889.

Application filed October 11, 1888. Serial No. 287,801. (No model.)

*To all whom it may concern:*

Be it known that I, CHARLES B. COLE, a citizen of the United States, residing at Detroit, county of Wayne, State of Michigan, have invented a certain new and useful Improvement in Underground Conduits for Electrical Conductors; and I declare the following to be a full, clear, and exact description of the invention, such as will enable others skilled in the art to which it appertains to make and use the same, reference being had to the accompanying drawings, which form a part of this specification, and in which—

Figure 1 represents a sectional view of my improved conduit in position underground. Fig. 2 is an end elevation, and Fig. 3 a plan view, of the same. Fig. 4 represents parts in detail.

As is well known, great difficulty has been experienced in properly insulating electric wires underground, and it is the object of my invention to provide a cheap system for laying wires underground and at the same time giving them sufficient insulation. To this end A is a wooden box or casing laid beneath the surface of the ground, and B are wooden tubes or conduits laid in this box, and in which the wires C are inserted. This box and the tubes may be thoroughly insulated by introducing them into a bath of paraffine, and being constructed of soft wood they will readily absorb this paraffine and become thoroughly saturated with it.

The tubes B are constructed of upper and lower halves, $b\ b'$, joined together by groove-and-tenon joints, and by breaking the joints of these halves it will be seen that a continuous tube will be formed. So, also, in the box or casing the sides and bottom may be fastened together in certain lengths by screws or nails and the joints given a coat of white lead, and these lengths fastened together by groove-and-tenon joints. The joints of the top, which may be nailed or screwed to the sides, may be broken with those of the sides, and thus a solid and continuous casing will be formed.

D are the man-holes, constructed at desired intervals, by which access may be had to the tubes for insertion or connection of wires.

E are bridges provided with recesses $e$, in which the tubes rest and by which they are kept clear from the bottom and a proper distance from each other. They may be constructed of wood and soaked with paraffine, or may be made of glass or other insulating material.

The mode of constructing my system is as follows: The box or casing A is placed in a suitable trench beneath the surface of the ground. A sufficient number of the bridges E to properly sustain the tubes are then laid on the bottom of the casing, and on these bridges are laid the lower halves, $b'$, of a number of tubes—in this case four—and into these the wires are laid, and the upper halves, $b$, fitted on. Another set of the bridges is then introduced on top of the tubes and another set of tubes with the wires laid thereon, and this is continued until the box or casing is filled. At each man-hole the end of the casing is provided with an end piece of wood, F, which has been paraffined, and which is provided with orifices $f$, corresponding with the ends of the tubes through which the wires may be passed. Between the end of the casing and this end piece may be introduced a sheet of rubber or other insulating material, $f'$, provided with orifices corresponding to those of the end piece.

When the box or casing has been filled with the tubes containing the wires and the end pieces nailed or otherwise fastened thereon, a filling compound, G, is poured in. This compound may be composed of any ingredients that will give it sufficient plastic and insulating qualities and also make it impervious to moisture. A composition of pitch, tar, and tallow has been found most desirable. After this compound has been introduced the top of the casing is fastened on, small strips o cleats H being first laid on the tops of the upper row of tubes to hold them firmly in place when the top is put on. If desired, the top may be put on before the introduction of the compound, the latter being poured in through an opening that has been left in the top.

It will be seen that thorough insulation is provided for, the wires themselves having the usual insulating-covering, the tubes being paraffined, the tubes surrounded with the insulating compound, and the box or casing paraffined.

The wires may be drawn through the tubes from man-hole to man-hole in the usual way, if desired.

What I claim is—

1. An underground conduit for electric wires, consisting of a wooden box or casing saturated with an insulating material, separable wooden tubes, also thoroughly insulated, into which the wires may be inserted, insulating-bridges adapted to keep the tubes in place, and a filling of plastic insulating compound adapted to exclude moisture, substantially as described.

2. An underground conduit for electric wires, consisting of a wooden box or casing saturated with an insulating material, separable wooden tubes saturated with an insulating material, in which the wire may be laid, said tubes being united throughout their length by groove-and-tenon joints, separate insulating-bridges adapted to sustain the tubes in proper position, and a filling of a plastic insulating compound adapted to exclude the moisture, substantially as described.

3. An underground conduit for electric wires, consisting of a wooden casing having a removable top, said casing and top saturated with paraffine, separable wooden tubes saturated with paraffine and adapted to receive the wires, the separate parts of said tubes united throughout their length by groove-and-tenon joints, separate insulating-bridges provided with recesses $b$, in which the tubes rest, end pieces for the casing consisting of a sheet of rubber and a cap of wood saturated with paraffine, the wood and rubber provided with orifices corresponding to the ends of the tubes, and a filling of a plastic insulating compound adapted to exclude the moisture, substantially as described.

4. An underground-conduit casing consisting of bottom, sides, and top made of wood, the ends of said bottom, sides, and top each joined to its meeting part by a deep mortise-and-tenon joint, the top or top and sides caused to break joints with the bottom of the casing, substantially as described.

In testimony whereof I sign this specification in the presence of two witnesses.

CHARLES B. COLE.

Witnesses:
M. B. O'DOGHERTY,
SAMUEL E. THOMAS.